US010825409B2

(12) United States Patent
Chen

(10) Patent No.: US 10,825,409 B2
(45) Date of Patent: Nov. 3, 2020

(54) LIQUID CRYSTAL DISPLAY AND METHOD FOR DRIVING SAME

(71) Applicants: HKC CORPORATION LIMITED, Guangdong (CN); CHONGQING HKC OPTOELECTRONICS TECHNOLOGY CO., LTD., Chongqing (CN)

(72) Inventor: Yu-jen Chen, Chongqing (CN)

(73) Assignees: HKC CORPORATION LIMITED, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/314,488

(22) PCT Filed: Apr. 24, 2017

(86) PCT No.: PCT/CN2017/081664
§ 371 (c)(1),
(2) Date: Dec. 31, 2018

(87) PCT Pub. No.: WO2018/120535
PCT Pub. Date: Jul. 5, 2018

(65) Prior Publication Data
US 2019/0317369 A1    Oct. 17, 2019

(30) Foreign Application Priority Data
Dec. 27, 2016 (CN) .......................... 2016 1 1227794

(51) Int. Cl.
*G02F 1/1337* (2006.01)
*G09G 3/36* (2006.01)
(Continued)

(52) U.S. Cl.
CPC ......... *G09G 3/3607* (2013.01); *G02F 1/1368* (2013.01); *G02F 1/13306* (2013.01);
(Continued)

(58) Field of Classification Search
CPC .. G09G 3/3607; G09G 3/3611; G09G 3/3677; G09G 3/3426; G09G 3/3666;
(Continued)

(56) References Cited

U.S. PATENT DOCUMENTS

2002/0109659 A1    8/2002  Hiroki
2011/0227940 A1*   9/2011  Neal .................... G09G 3/3426
                                                            345/589
2016/0240151 A1*   8/2016  Cao ...................... G09G 3/3607

FOREIGN PATENT DOCUMENTS

CN    101261816 A    9/2008
CN    104658499 A    5/2015
(Continued)

OTHER PUBLICATIONS

Translation of International Search Report for International Application No. PCT/CN2017/081664; dated Oct. 9, 2017, 2 pages.

*Primary Examiner* — Mark W Regn
(74) *Attorney, Agent, or Firm* — Bond Schoeneck & King, PLLC; George McGuire

(57) ABSTRACT

A liquid crystal display device and a method for driving the liquid crystal display device are provided. The liquid crystal display device includes a liquid crystal display panel and a driving circuit. The liquid crystal display panel includes multiple liquid crystal display pixels disposed in a matrix. The liquid crystal display device is configured to display a same picture in two successive frames. The driving circuit is configured to apply pixel voltages to each of the multiple liquid crystal display pixels separately in the two successive frames so that liquid crystal molecules of each of the multiple liquid crystal display pixels are rotated. In each of (Continued)

the two successive frames, a voltage value of a pixel voltage of each liquid crystal display pixel is different from that of adjacent liquid crystal display pixels. Pixel voltages of a same liquid crystal display pixel in a preceding one frame and in a succeeding frame have a same polarity and different voltage values.

16 Claims, 5 Drawing Sheets

(51) Int. Cl.
    *G09G 3/34*     (2006.01)
    *G02F 1/133*     (2006.01)
    *G02F 1/13357*     (2006.01)
    *G02F 1/1333*     (2006.01)
    *G02F 1/1335*     (2006.01)
    *G02F 1/1368*     (2006.01)
    *G02F 1/1362*     (2006.01)

(52) U.S. Cl.
CPC .. *G02F 1/133308* (2013.01); *G02F 1/133514* (2013.01); *G02F 1/133611* (2013.01); *G02F 1/133753* (2013.01); *G09G 3/3406* (2013.01); *G09G 3/3426* (2013.01); *G09G 3/367* (2013.01); *G09G 3/3611* (2013.01); *G09G 3/3614* (2013.01); *G09G 3/3648* (2013.01); *G09G 3/3666* (2013.01); *G09G 3/3677* (2013.01); *G02F 1/1362* (2013.01); *G02F 2001/133601* (2013.01); *G02F 2201/52* (2013.01); *G09G 2310/0254* (2013.01); *G09G 2320/0233* (2013.01); *G09G 2320/0242* (2013.01); *G09G 2320/0247* (2013.01); *G09G 2320/062* (2013.01); *G09G 2320/0626* (2013.01); *G09G 2320/0666* (2013.01); *G09G 2320/0686* (2013.01); *G09G 2340/16* (2013.01)

(58) Field of Classification Search
CPC .... G09G 3/3406; G09G 3/367; G09G 3/3614; G09G 3/3648; G09G 2340/16; G09G 2320/0626; G09G 2320/062; G09G 2310/0254; G09G 2320/0247; G09G 2320/0242; G09G 2320/0686; G09G 2320/0666; G09G 2320/0233; G02F 1/133753; G02F 1/1368; G02F 1/133514; G02F 1/133308; G02F 1/133611; G02F 1/13306; G02F 2001/133601; G02F 1/1362; G02F 2201/52
See application file for complete search history.

(56) References Cited

FOREIGN PATENT DOCUMENTS

| | | |
|---|---|---|
| CN | 104751817 A | 7/2015 |
| CN | 106531106 A | 3/2017 |

* cited by examiner

LIQUID CRYSTAL DISPLAY AND METHOD FOR DRIVING SAME

CROSS-REFERENCE TO RELATED APPLICATION

The present application is the National Stage Application, filed under 35 U.S.C. 371, of International Patent Application No. PCT/CN2017/081664, filed on Apr. 24, 2017, which claims priority to Chinese patent application No. 201611227794.0 filed on Dec. 27, 2016, contents of both of which are incorporated herein by reference in their entireties.

TECHNICAL FIELD

The present disclosure relates to the field of display technology, particularly to a Liquid Crystal Display device and a method for driving a liquid crystal display device.

BACKGROUND

The evolution of the optoelectronic technology and the semiconductor technology has boosted the development of Flat Panel Displays (FPDs). Among numerous FPDs, Liquid Crystal Display (LCD) has been applied to many aspects of production and life for their advantages of high space utilization efficiency, low power consumption, no radiation and low electromagnetic interference.

A liquid crystal display device usually includes a liquid crystal display panel, a backlight module and a driving module for driving the liquid crystal display panel and the backlight module, where the LCD panel includes a color filter (CF) substrate and an array substrate disposed opposing to each other, and liquid crystals sandwiched between the two. A large-sized LCD panel usually uses Vertically Aligned (VA) negative liquid crystals. However, the VA negative liquid crystals have many defects. Particularly, when observed in a large viewing angle, an LCD panel with VA negative liquid crystals has a color shift phenomenon.

To prevent the foregoing defects, each sub-pixel in a liquid crystal display panel with VA negative liquid crystals is usually divided into a primary sub-pixel and a secondary sub-pixel, and the primary sub-pixel and the secondary sub-pixel are supplied with different pixel voltages. However, in such a pixel design, more metal wires and Thin Film Transistors (TFTs) are need to drive the primary and secondary sub-pixels, the aperture ratio is reduced and thus the transmittance of the liquid crystal display panel is reduced. To maintain the original transmittance, luminance of light emitted from the backlight module needs to be enhanced, as a result, the cost of the backlight module increases.

SUMMARY

The present disclosure provides a liquid crystal display device and a driving method thereof capable of preventing low color shift phenomenon without affecting aperture ratio.

According to the first aspect, there is provided a liquid crystal display device including a liquid crystal display panel and a driving circuit. The liquid crystal display panel includes a plurality of liquid crystal display pixels disposed in a matrix manner and the liquid crystal display panel is configured to display a same picture in two successive frames. The driving circuit is configured to apply pixel voltages to each of the plurality of liquid crystal display pixels separately in the two successive frames so that liquid crystal molecules of each of the plurality of liquid crystal display pixels are deflected. In each of the two successive frames, for each of the plurality of liquid crystal display pixels, a voltage value of a pixel voltage is different from that of an adjacent liquid crystal display pixel. Pixel voltages of a same liquid crystal display pixel in a preceding one of the two successive frames and in a succeeding one of the two successive frames have a same polarity and different voltage values.

Optionally, the liquid crystal display device further includes a backlight module, where the liquid crystal display panel is divided into M×N rectangular panel zones, the backlight module is divided into M×N rectangular backlight zones, and a rectangular panel zone of the ith row and the jth column corresponds to a rectangular backlight zone of the ith row and the jth column, where formulas 1≤i≤M and 1≤j≤N apply; and in each of the two successive frames, after liquid crystal molecules of all liquid crystal display pixels in each of the rectangular panel zones are deflected, the driving circuit is further configured to drive all of the rectangular backlight zones to emit light simultaneously.

Optionally, the liquid crystal display device further includes a backlight module, where the liquid crystal display panel is divided into M×N rectangular panel zones, the backlight module is divided into M×N rectangular backlight zones, and a rectangular panel zone of the ith row and the jth column corresponds to a rectangular backlight zone of the ith row and the jth column, where formulas 1≤i≤M and 1≤j≤N apply; and in each of the two successive frames, after liquid crystal molecules of each liquid crystal display pixel in the rectangular panel zone of the ith row and jth column are deflected, the driving circuit is further configured to drive the rectangular backlight zone of the ith row and jth column to emit light until the driving circuit drives all of the rectangular backlight zones to emit light.

Optionally, luminance of the rectangular backlight zone of the ith row and jth column and a sum of pixel voltages of all liquid crystal display pixels in the rectangular panel zone of the ith row and jth column meet the following formula:

$$L_{i,j\_1} * V_{i,j\_1} = L_{i,j\_2} * V_{i,j\_2},$$

where $L_{i,j\_1}$ denotes luminance of the rectangular backlight zone of the ith row and jth column in the preceding one of the two successive frames, $V_{i,j\_2}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

Optionally, luminance of the rectangular backlight zone of the ith row and jth column and a sum of pixel voltages of all liquid crystal display pixels in the rectangular panel zone of the ith row and jth column meet the following formula:

$$L_{i,j\_1} * V_{i,j\_1} + L_{i,j\_2} * V_{i,j\_2} = 2 * L_{i,j} * V_{i,j},$$

where $L_{i,j}$ denotes luminance of the rectangular backlight zone of the ith row and jth column when the liquid crystal display device is configured to display a picture in only one frame, $V_{i,j}$ denotes a sum of pixel voltages of all liquid crystal display pixels in all of the rectangular panel zones when the liquid crystal display device is configured to display a picture in only one frame, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

According to the second aspect, there is further provided a method for driving a liquid crystal display device. The liquid crystal display device includes a liquid crystal display panel and a driving circuit, and the liquid crystal display panel includes a plurality of liquid crystal display pixels disposed in a matrix manner; and the method includes:

in a preceding one of two successive frames, applying pixel voltages, by the driving circuit, to each of the plurality of liquid crystal display pixels of the liquid crystal display panel separately so that all liquid crystal molecules of each of the plurality of liquid crystal display pixels are deflected, where the liquid crystal display panel is configured to display a same picture in the two successive frames; and in a succeeding one of the two successive frames, applying pixel voltages, by the driving circuit, to each of the plurality of liquid crystal display pixels of the liquid crystal display panel separately so that all liquid crystal molecules of each of the plurality of liquid crystal display pixels are deflected, where in each of the two successive frames, a voltage value of the pixel voltage of each of the plurality of liquid crystal display pixels is different from that of an adjacent liquid crystal display pixel, and pixel voltages of a same liquid crystal display pixel in the preceding one of the two successive frames and in the succeeding one of the two successive frames have a same polarity and different voltage values.

Optionally, the liquid crystal display device further includes a backlight module, where the liquid crystal display panel is divided into M×N rectangular panel zones, the backlight module is divided into M×N rectangular backlight zones and a rectangular panel zone of the ith row and jth column corresponds to a rectangular backlight zone of the ith row and jth column, where formulas $1 \leq i \leq M$ and $1 \leq j \leq N$ apply; and the method further includes:

in the preceding one of the two successive frames, after liquid crystal molecules of all liquid crystal display pixels in each of the rectangular panel zones are deflected, driving all of the rectangular backlight zones, by the driving circuit, to emit light simultaneously; and in the succeeding frame of the two successive frames, after liquid crystal molecules of all liquid crystal display pixels in each of the rectangular panel zones are deflected, driving all of the rectangular backlight zones, by the driving circuit, to emit light simultaneously.

Optionally, the liquid crystal display device further includes a backlight module, where the liquid crystal display panel is divided into M×N rectangular panel zones, the backlight module is divided into M×N rectangular backlight zones and a rectangular panel zone of the ith row and jth column corresponds to a rectangular backlight zone of the ith row and jth column, where formulas $1 \leq i \leq M$ and $1 \leq j \leq N$ apply; and the method further includes:

in the preceding one of the two successive frames, after liquid crystal molecules of all liquid crystal display pixels in the rectangular panel zone of the ith row and jth column are deflected, driving the rectangular backlight zone of the ith row and jth column, by the driving circuit, to emit light until the driving circuit drives all of the rectangular backlight zones to emit light; and in the succeeding one of the two successive frames, after liquid crystal molecules of each liquid crystal display pixel in the rectangular panel zone of the ith row and jth column are deflected, driving the rectangular backlight zone of the ith row and jth column, by the driving circuit, to emit light until the driving circuit drives all of the rectangular backlight zones to emit light.

Optionally, luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}=L_{i,j\_2}*V_{i,j\_2},$$

where $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

Optionally, luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

where $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all liquid crystal display pixels in all of the rectangular panel zones when the liquid crystal display device is configured to display the picture in only one frame.

Luminance of the rectangular backlight zone of the ith row and jth column and a sum of pixel voltages of all liquid crystal display pixels in the rectangular panel zone of the ith row and jth column meet the following formulas:

$$L_{i,j\_1}*V_{i,j\_1}=L_{i,j\_2}*V_{i,j\_2}, \text{ and}$$

$$L_{i,j\_1}*V_{i,j\_1}+L_{i,j\_2}*V_{i,j\_2}=2*L_{i,j}*V_{i,j},$$

where $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all liquid crystal display pixels in all of the rectangular panel zones when the liquid crystal display device is configured to display the picture in only one frame.

The present disclosure further provides a method for driving a liquid crystal display device, where the liquid crystal display device includes a liquid crystal display panel and a driving circuit, and the liquid crystal display panel includes a plurality of liquid crystal display pixels disposed in a matrix manner; and the method includes:

in a preceding one of two successive frames, applying a first pixel voltage, by the driving circuit, to a first liquid crystal display pixel of the liquid crystal display panel and applying a second pixel voltage, by the driving circuit, to a second liquid crystal display pixel of the liquid crystal display panel so that liquid crystal molecules of the first liquid crystal display pixel are deflected, where the liquid crystal display panel is configured to display a same picture in the two successive frames; and in a succeeding one of the two successive frames, applying the second pixel voltage, by the driving circuit, to the first liquid crystal display pixel of the liquid crystal display panel and applying the first pixel voltage, by the driving circuit, to the second liquid crystal display pixel of the liquid crystal display panel so that liquid crystal molecules of the first liquid crystal display pixel are deflected, where the first liquid crystal display pixel is any one of the plurality of liquid crystal display pixels, the second liquid crystal display pixel is a liquid crystal display pixel adjacent to the first liquid crystal display pixel. The first pixel voltage and the second pixel voltage have a same polarity and different voltage values, are stored in a Look-Up-Table (LUT) form in the driving circuit and are determined in advance by inputted Red, Green, Blue (RGB) signals and viewing angles to be compensated. Pixel voltages are applied to each of the plurality of LCD pixels separately in the two successive frames. In each of the two successive frames, the voltage value of the pixel voltage of each of the plurality of LCD pixels is different from that of an adjacent LCD pixels, and the pixel voltages of a same LCD pixel in the preceding one of the two successive frames and in the succeeding one of the two successive frames have a same polarity and different voltage values, so that low color shift angle can be compensated when the LCD panel displays a same picture in the two successive frames, that is, color shift phenomenon does not occur on the LCD panel when observed at a large viewing angle. In addition, the LCD pixel is not divided into primary and secondary sub-pixels, so no more metal wires and TFTs need to be added to drive the primary and secondary sub-pixels and thus the aperture ratio does not decrease. The product of luminance of each of the rectangular backlight zones and the sum of pixel voltages of all LCD pixels in the corresponding one of the rectangular panel zones in the preceding one of the two successive frames is equal to that in the succeeding one of the two successive frames, so that display luminance of each of the rectangular panel zones in the preceding one of the two successive frames is equal to that in the succeeding one of the two successive frames, thereby eliminating flicker. The sum of luminance of the picture displayed by each of the rectangular panel zones of the display panel in the preceding one of the two successive frames and that in the succeeding one of the two successive frames is twice luminance of the picture displayed by the LCD panel without low color shift angle compensation, in one frame, so that luminance of the picture displayed by the LCD panel is equal to luminance of the picture displayed by the LCD panel without low color shift angle compensation.

BRIEF DESCRIPTION OF DRAWINGS

The detailed description set forth below in connection with the accompanying drawings is intended to make features of embodiments of the present disclosure apparent.

DETAILED DESCRIPTION

The following embodiments will be described in detail with reference to the accompanying drawings. If not in collision, the following embodiments and the features thereof may be combined arbitrarily.

Figure 1:
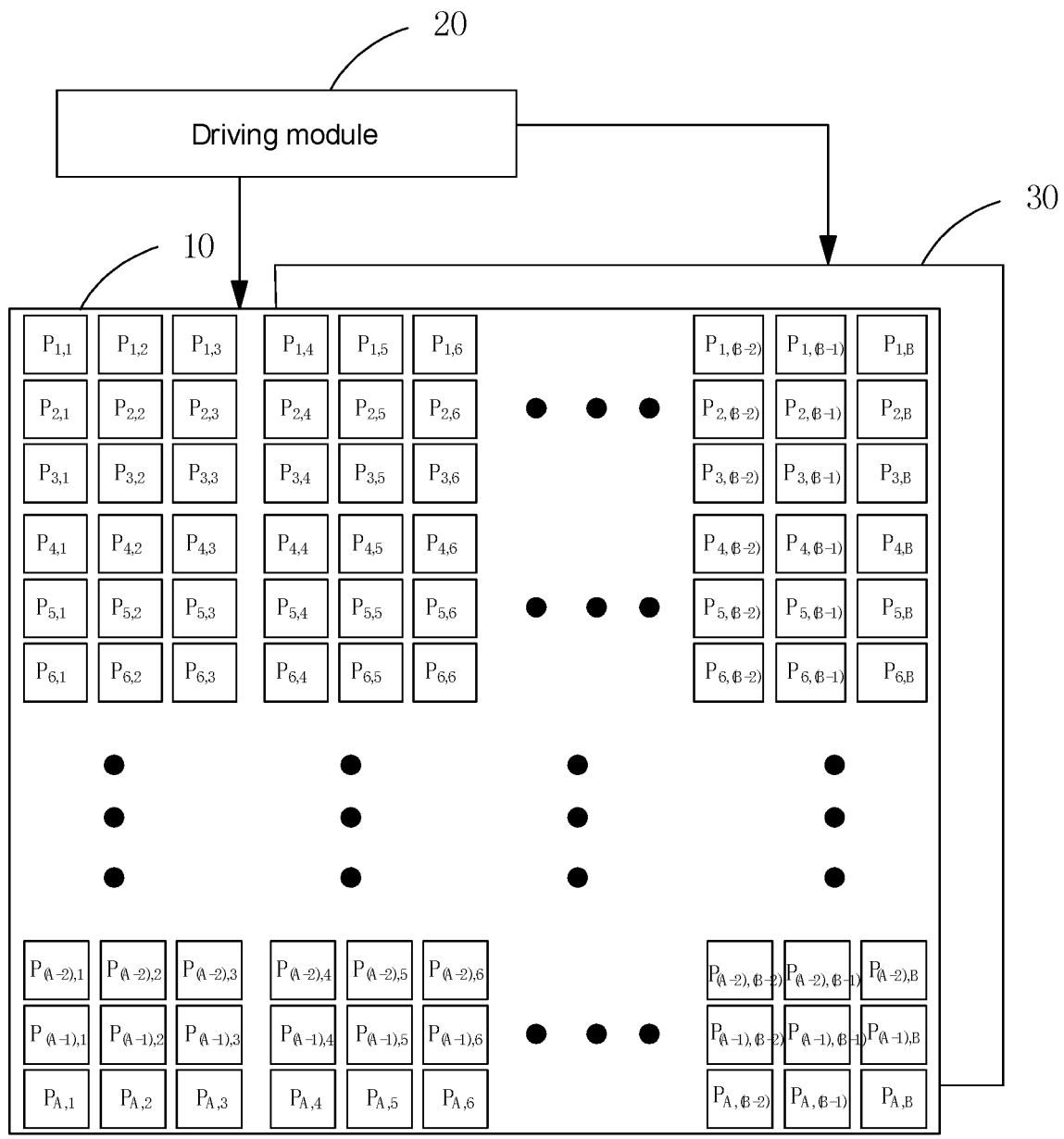
FIG. 1 is structural diagram 1 of an LCD device according to an embodiment.

FIG. 1 is structural diagram 1 of a liquid crystal display device according to an embodiment.

As shown in FIG. 1, the LCD device according to the embodiment includes an LCD panel 10, a driving module (also referred to as driving circuit) 20 and a backlight module 30.

The LCD panel 10 may include a color filter (CF) substrate and an array substrate disposed opposing to each other, and VA negative liquid crystals sandwiched between the two. The LCD panel 10 may be one with a VA display mode.

In the process of assembling the LCD device, the LCD panel 10 and the backlight module 30 may be oppositely disposed and be secured by a fixed structure such as a frame. The driving module 20 drives the backlight module 30 to emit light which will be used by the LCD panel 10. FIG. 1 does not show the assembled state of the LCD panel 10 and the backlight module 30.

The LCD panel 10 includes A×B LCD pixels (namely sub-pixels) $P_{1,1}$, $P_{1,2}$, . . . and $P_{A,B}$, where × is a multiplication operator. An LCD pixel $P_{a,b}$ (where a and b are integers meeting formulas 1≤a≤A and 1≤b≤B) may be a red LCD pixel, a green LCD pixel or a blue LCD pixel. The LCD pixels $P_{1,1}$, $P_{1,2}$, and $P_{A,B}$ include at least one red LCD pixel, at least one green LCD pixel and at least one blue LCD pixel. Optionally, LCD pixels arranged in a column direction (vertical direction in FIG. 1) are of the same color, while in a row direction (horizontal direction in FIG. 1), groups each including a red LCD pixel group, a green LCD pixel group and a blue LCD pixel in order are sequentially disposed.

In the LCD panel 10 according to the embodiment, each of the LCD pixels is not divided into a primary sub-pixel and a secondary sub-pixel. To prevent shift phenomenon when the LCD panel 10 is observed at a large viewing angle, a technical solution according to the embodiment may include: displaying a same picture, by the LCD panel 10, in two successive frames; and applying drive voltages, by the driving module 20, to each of the LCD pixels separately in the two successive frames so that liquid crystal molecules of each of the LCD pixels are deflected. In each of the two successive frames, the voltage value of the pixel voltage of each of the LCD pixels is different from that of each of adjacent LCD pixels, and the pixel voltages of a same LCD pixel in the preceding one of the two successive frames and in the succeeding one of the two successive frames have a same polarity and different voltage values.

The frame refresh rate of the LCD panel 10 is doubled, for example, raised from 60 Hz to 120 Hz.

As shown in FIG. 1, in the preceding one of the two successive frames, the driving module 20 applies a high pixel voltage (or a low pixel voltage) to the LCD pixel $P_{a,b}$ to deflect liquid crystal molecules of the LCD pixel $P_{a,b}$; and applies low pixel voltages (or high pixel voltages) to LCD pixels $P_{(a-1),b}$, $P_{a,(b-1)}$, $P_{a,(b+1)}$ and $P_{(a+1),b}$.

In the succeeding one of the two successive frames, the driving module 20 applies the low pixel voltage (or the high pixel voltage) to the LCD pixel $P_{a,b}$ to deflect liquid crystal molecules of the LCD pixel $P_{a,b}$; and applies high pixel voltages (or low pixel voltages) to LCD pixels $P_{(a-1),b}$, $P_{a,(b-1)}$, $P_{a,(b+1)}$ and $P_{(a+1),b}$.

The voltage value of the pixel voltage of each of the LCD pixels is different from that of each of adjacent LCD pixels. The pixel voltages of a same LCD pixel in the preceding one of the two successive frames and in the succeeding one of the two successive frames have a same polarity and different voltage values. The LCD panel 10 can display the same picture in the two successive frames.

The high pixel voltages and the low pixel voltages are determined in advance by inputted RGB (Red, Green, Blue) signals and viewing angles needed to compensate, and may be recorded in a form of LUT in the driving module 20. For example, taking drive signals of 8 bits as an example, the R signal, G signal and B signal in the inputted RGB signals correspond to 256 pairs of pixel voltages (each pair includes a high pixel voltage and a low pixel voltage), respectively, and there are totally 3*256 high pixel voltages and 3*256 low pixel voltages, where * is a multiplication operator.

To sum up, pixel voltages with the same polarity and different voltage values are applied to each of the LCD pixels in the preceding one of the two successive frames and in the succeeding one of the two successive frames separately, and the voltage value of the pixel voltage of each of the LCD pixels is different from that of each of adjacent LCD pixels, so that low color shift angle can be compensated when the LCD panel 10 displays the same picture in the two successive frames, that is, color shift phenomenon does not occur on the LCD panel 10 when observed at a large viewing angle.

Figure 2:
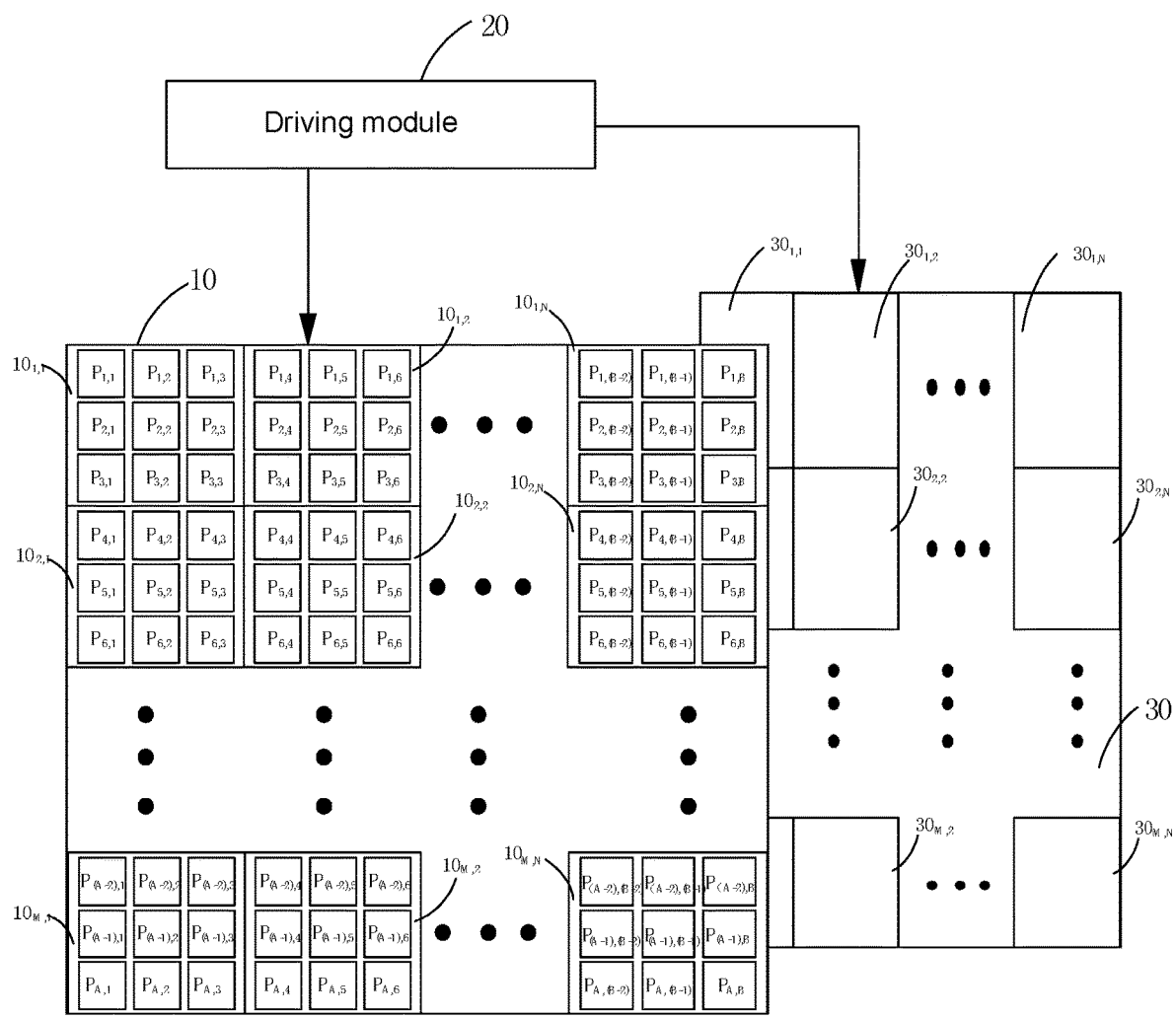
FIG. 2 is structural diagram 2 of an LCD device according to an embodiment.

To eliminate flicker caused by uneven luminance of each LCD pixel of the LCD panel 10 between the two successive frames, optionally, the backlight module 30 is divided into multiple backlight zones and luminance of each backlight zone is dynamically adjusted, so that luminance of each LCD pixel of the LCD panel 10 is uniform and thus the flicker is eliminated. See an LCD panel in FIG. 2. FIG. 2 is structural diagram 2 of the LCD device according to an embodiment. The following lists differences between the embodiment shown in FIG. 2 and the embodiment shown in FIG. 1.

As shown in FIG. 2, compared with the embodiment shown in FIG. 1, in the LCD device in FIG. 2, an LCD panel 10 is divided into M×N rectangular panel zones $10_{1,1}$, $10_{1,2}$, . . . and $10_{M,N}$, and a backlight module 30 is divided into M×N rectangular backlight zones $30_{1,1}$, $30_{1,2}$, . . . and $30_{M,N}$. The rectangular panel zone $10_{i,j}$ corresponds to the rectangular backlight zone $30_{i,j}$, where i and j are integers that meet formulas $1 \le i \le M$ and $1 \le j \le N$. The quantity of LCD pixels included in each rectangular panel zone may be the same or different.

Luminance of the rectangular backlight zone $30_{i,j}$ and the sum of pixel voltages of all LCD pixels in the rectangular panel zone $10_{i,j}$ meet the following formula 1:

$$L_{i,j\_1} * V_{i,j\_1} = L_{i,j\_2} * V_{i,j\_2},\qquad\text{[Formula 1]}$$

where $L_{i,j\_1}$ denotes luminance of the rectangular panel zone $10_{i,j}$ in the preceding one of the two successive frames, $V_{i,j\_1}$ denotes the sum of pixel voltages of all LCD pixels in the rectangular panel zone $10_{i,j}$ in the preceding one of the two successive frames, $L_{i,j\_2}$ denotes luminance of the rectangular backlight zone $30_{i,j}$ in the succeeding one of the two successive frames, and $V_{i,j\_2}$ denotes the sum of pixel voltages of all LCD pixels in the rectangular backlight zone $30_{i,j}$ in the succeeding one of the two successive frames.

Since the pixel voltage of the LCD pixel is directly proportional to the light transmittance of the LCD pixel, the product of the backlight luminance and the light transmittance of the LCD pixel constitutes the display luminance of the LCD pixel and the product of the backlight luminance and the pixel voltage of the LCD pixel represents the display luminance of the LCD pixel. When the product of luminance of the rectangular backlight zone $30_{i,j}$ and the sum of pixel voltages of all LCD pixels in the rectangular panel zone $10_{i,j}$ in the preceding one of the two successive frames is equal to that in the succeeding one of the two successive frames, the display luminance of the rectangular panel zone $10_{i,j}$ in the preceding one of the two successive frames is equal to that in the succeeding one of the two successive frames, thereby eliminating flicker.

After the LCD panel 10 and the backlight module 30 are divided into zones, the backlight module 30 may supply display light to the LCD panel 10 in the following two methods.

In the first method of supplying display light by the backlight module 30 to the liquid crystal display panel 10, in each of the two successive frames, after liquid molecules of all LCD pixels in all of the rectangular panel zones $10_{1,1}$, $10_{1,2}$, . . . and $10_{M,N}$ are deflected, the driving module 20 drives all of the rectangular backlight zones $30_{1,1}$, $30_{1,2}$, . . . and $30_{M,N}$ to emit light simultaneously. Each of the rectangular backlight zones may have a different or same luminance. The luminance of each rectangular backlight zone is adjusted by the driving module 20.

In the second method, in each of the two successive frames, after liquid molecules of all LCD pixels in the rectangular panel zone $10_{i,j}$ are deflected, the driving module 20 drives the rectangular backlight zone $30_{i,j}$ to emit light until it drives all of the rectangular backlight zones $30_{1,1}$, $30_{1,2}$, . . . and $30_{M,N}$ to emit light. The driving module 20 drives each of the rectangular backlight zones in a time division mode. Each of the rectangular backlight zones may have a different or same luminance. The luminance of each rectangular backlight zone is adjusted by the driving module 20.

To make luminance of a picture displayed by the LCD panel 10 equal to luminance of the picture displayed by an LCD panel without low color shift angle compensation, optionally, the sum of luminance of the picture displayed by each of the rectangular panel zones of the LCD panel 10 in the preceding one of the two successive frames and that in the succeeding one of the two successive frames is twice luminance of the picture displayed by the LCD panel without low color shift angle compensation in one frame.

Luminance of the rectangular backlight zone $30_{i,j}$ and the sum of pixel voltages of all LCD pixels in the rectangular panel zone $10_{i,j}$ meet the following formula 2:

$$L_{i,j\_1}*V_{i,j\_1}+L_{i,j\_2}*V_{i,j\_2}=2*L_{i,j}*V_{i,j}, \quad \text{[Formula 2]}$$

where $L_{i,j}$ denotes luminance of the corresponding rectangular backlight zone when the LCD device without low color shift angle compensation is configured to display the picture in only one frame and $V_{i,j}$ denotes the sum of pixel voltages of all LCD pixels in the corresponding rectangular panel zones when the LCD device without low color shift angle compensation is configured to display the picture in only one frame. The LCD device without low color shift angle compensation displays different pictures in different frames.

Figure 3:
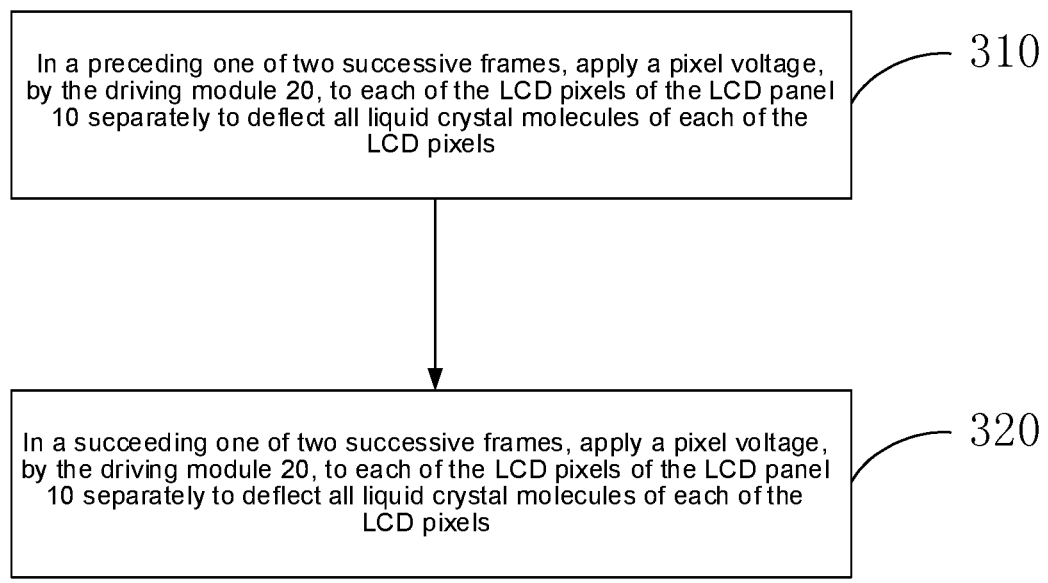
FIG. 3 is a flowchart of a method for driving the LCD device illustrated in FIG. 1.

The following describes a methods for driving the LCD device. FIG. 3 is a flowchart of a method for driving the LCD device illustrated in FIG. 1.

As shown in FIG. 1 and FIG. 3, the method for driving the LCD device according to an embodiment includes:

At Step 310, in the preceding one of the two successive frames, pixel voltages are applied by the driving module 20 to each of the LCD pixels of the LCD panel 10 separately so that all liquid crystal molecules of each of the LCD pixels are deflected; and At Step 320, in the succeeding one of the two successive frames, pixel voltages are applied by the driving module 20 to each of the LCD pixels of the LCD panel 10 separately so that all liquid crystal molecules of each of the LCD pixels are deflected.

In the preceding frame and the succeeding frame, the voltage value of the pixel voltage of each of the LCD pixels is different from that of each of adjacent LCD pixels, and the pixel voltages of a same LCD pixel in the preceding one of the two successive frames and in the succeeding one of the two successive frames have a same polarity and different voltage values.

Figure 4:
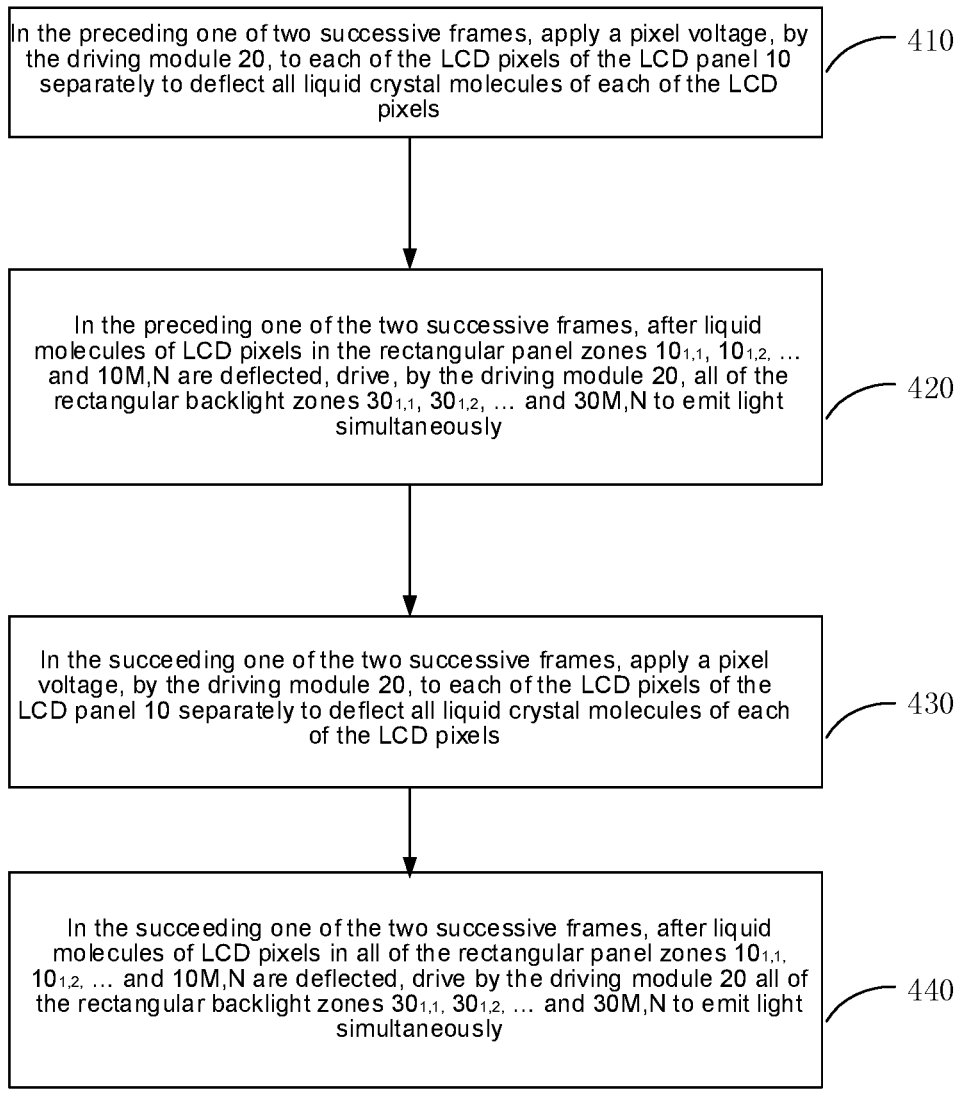
FIG. 4 is a flowchart 1 of a method for driving the LCD device illustrated in FIG. 2.

FIG. 4 is a flowchart 1 of a method for driving the LCD device illustrated in FIG. 2.

As shown in FIG. 2 and FIG. 4, the method for driving the LCD device according to an embodiment includes:

At Step 410, in the preceding one of the two successive frames, pixel voltages are applied by the driving module 20 to each of the LCD pixels of the LCD panel 10 separately so that all liquid crystal molecules of each of the LCD pixels are deflected;

At Step 420, in the preceding one of the two successive frames, after liquid molecules of LCD pixels in all of the rectangular panel zones $10_{1,1}$, $10_{1,2}$, . . . and $10_{M,N}$ are deflected, the driving module 20 drives all of the rectangular backlight zones $30_{1,1}$, $30_{1,2}$, . . . and $30_{M,N}$ to emit light simultaneously;

At Step 430, in the succeeding one of the two successive frames, pixel voltages are applied by the driving module 20 to each of the LCD pixels of the LCD panel 10 separately so that all liquid crystal molecules of each of the LCD pixels are deflected; and At Step 440, in the succeeding one of the two successive frames, after liquid molecules of LCD pixels in all of the rectangular panel zones $10_{1,1}$, $10_{1,2}$, . . . and $10_{M,N}$ are deflected, the driving module 20 drives all of the rectangular backlight zones $30_{1,1}$, $30_{1,2}$, . . . and $30_{M,N}$ to emit light simultaneously, In the preceding frame and the succeeding frame, the voltage value of the pixel voltage of each of the LCD pixels is different from the voltage values of the pixel voltages of the adjacent LCD pixels, and the pixel voltages of a same LCD pixel in the preceding one of the two successive frames and in the succeeding one of the two successive frames have a same polarity and different voltage values.

Figure 5:
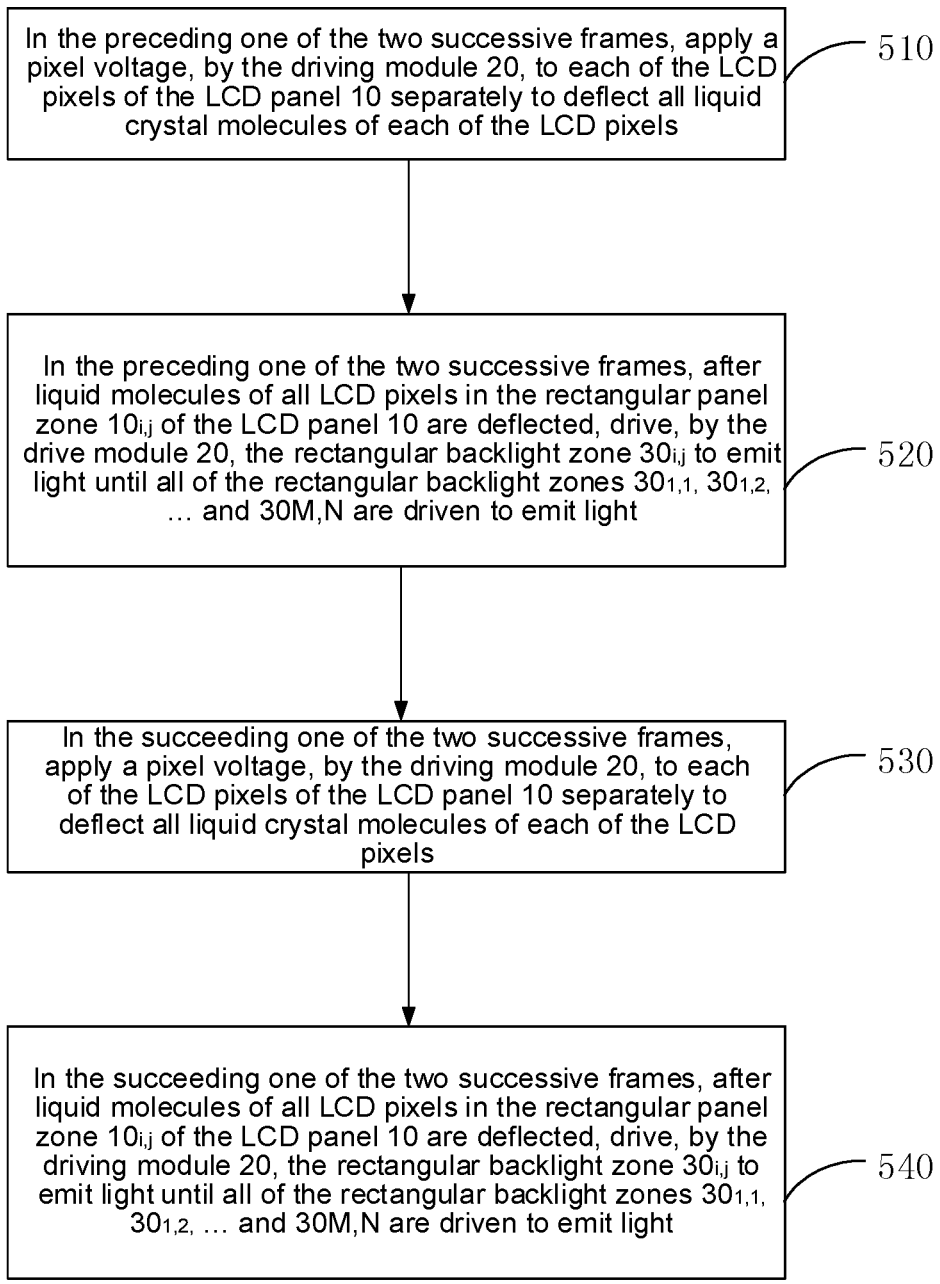
FIG. 5 is a flowchart 2 of a method for driving the LCD device illustrated in FIG. 2.

FIG. 5 is a flowchart 2 of a method for driving the LCD device illustrated in FIG. 2.

As shown in FIG. 2 and FIG. 5, the method for driving the LCD device according to an embodiment includes:

At Step 510, in the preceding one of the two successive frames, pixel voltages are applied by the driving module 20 to each of the LCD pixels of the LCD panel 10 separately so that all liquid crystal molecules of each of the LCD pixels are deflected;

At Step 520, in the preceding one of the two successive frames, after liquid molecules of all LCD pixels in the rectangular panel zone $10_{i,j}$ of the LCD panel 10 are deflected, the driving module 20 drives the rectangular backlight zone 30, to emit light until it drives all of the rectangular backlight zones $30_{1,1}$, $30_{1,2}$, . . . and $30_{M,N}$ to emit light;

At Step 530, in the succeeding one of the two successive frames, pixel voltages are applied by the driving module 20, to each of the LCD pixels of the LCD panel 10 separately so that all liquid crystal molecules of each of the LCD pixels are deflected; and At Step 540, in the succeeding one of the two successive frames, after liquid molecules of all LCD pixels in the rectangular panel zone $10_{i,j}$ of the LCD panel 10 are deflected, the driving module 20 drives the rectangular backlight zone $30_{i,j}$ to emit light until it drives all of the rectangular backlight zones $30_{1,1}$, $30_{1,2}$, . . . and $30_{M,N}$ to emit light, In the preceding frame and the succeeding frame, the voltage value of the pixel voltage of each of the LCD pixels is different from the voltage values of the pixel voltages of adjacent LCD pixels, and the pixel voltages of a same LCD pixel in the preceding one of the two successive frames and in the succeeding one of the two successive frames have a same polarity and different voltage values.

Optionally, in the methods illustrated in FIG. 4 and FIG. 5, luminance of the rectangular backlight zone $30_{1,j}$ and the sum of pixel voltages of all LCD pixels in the rectangular panel zone $10_{i,j}$ meet at least one of the foregoing formula 1 and formula 2.

To sum up, pixel voltages with the same polarity but different voltage values are applied to each of the plurality of LCD pixels separately in the two successive frames, and in each of the two successive frames, the voltage value of the pixel voltage of each of the plurality of LCD pixels is different from that of each of adjacent LCD pixels, so that low color shift angle can be compensated when the LCD panel displays a same picture in the two successive frames, that is, color shift phenomenon does not occur on the LCD panel when observed at a large viewing angle. In addition, each of the plurality of LCD pixels is not divided into primary and secondary sub-pixels, so no more metal wires and TFTs need to be added to drive the primary and secondary sub-pixels and thus the aperture ratio does not decrease. The product of luminance of each of the rectangular backlight zones and the sum of pixel voltages of all LCD pixels in the corresponding one of the rectangular panel zones in the preceding one of the two successive frames is equal to that in the succeeding one of the two successive frames, so that display luminance of each of the rectangular panel zones in the preceding one of the two successive frames is equal to that in the succeeding one of the two successive frames, thereby eliminating flicker. The sum of luminance of the picture displayed by each of the rectangular panel zones of the display panel in the preceding one of the two successive frames and that in the succeeding one of the two successive frames is twice luminance of the picture displayed by the LCD panel without low color shift angle compensation in only one frame, so that luminance of the picture displayed by the LCD panel is equal to luminance of the picture displayed by the LCD panel without low color shift angle compensation.

INDUSTRIAL APPLICABILITY

A liquid crystal display device and a method for driving the liquid crystal display device according to the present disclosure can eliminate color shift phenomenon at a large viewing angle.

What is claimed is:

1. A liquid crystal display device, comprising:
a liquid crystal display panel; and
a driving circuit, wherein the liquid crystal display panel includes a plurality of liquid crystal display pixels disposed in a matrix manner, and the liquid crystal display panel is configured to display a same picture in two successive frames;
the driving circuit is configured to supply a pixel voltage for each of the plurality of liquid crystal display pixels in the two successive frames for rotating liquid crystal molecules of each of the plurality of liquid crystal display pixels;
in each of the two successive frames, for each of the plurality of liquid crystal display pixels, a voltage value of the pixel voltage is different from voltage values of pixel voltages of adjacent LCD pixels; and
pixel voltages of a same liquid crystal display pixel in a preceding one of the two successive frames and in a succeeding one of the two successive frames have a same polarity and different voltage values;
wherein the liquid crystal display device further comprises:
a backlight module, wherein the liquid crystal display panel is divided into (M×N) rectangular panel zones, the backlight module is divided into (M×N) rectangular backlight zones, and the rectangular panel zone of an ith row and jth column corresponds to the rectangular backlight zone of an ith row and jth column, where formulas 1≤i≤M and 1≤j≤N apply; and
in each of the two successive frames, after liquid crystal molecules of all liquid crystal display pixels in each of the rectangular panel zones are deflected, the driving circuit is further configured to drive all of the rectangular backlight zones to emit light simultaneously;
wherein luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

wherein * denotes a multiplication operator, $L_{i,j}$ denotes luminance of the rectangular backlight zone of the ith row and jth column when the liquid crystal display device is configured to display a picture in only one frame, $V_{i,j}$ denotes a sum of pixel voltages of all liquid crystal display pixels in all of the rectangular panel zones when the liquid crystal display device is configured to display the picture in only one frame, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

2. The liquid crystal display device of claim 1, wherein in each of the two successive frames, after liquid crystal molecules of all liquid crystal display pixels in the rectangular panel zone of the ith row and jth column are deflected, the driving circuit is further configured to drive the rectangular backlight zone of the ith row and jth column to emit light until the driving circuit drives all of the rectangular backlight zones to emit light.

3. The liquid crystal display device of claim 2, wherein luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}=L_{i,j\_2}*V_{i,j\_2},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

4. The liquid crystal display device of claim 3, wherein luminance of the rectangular backlight zone of the ith row and jth column and the sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

wherein $L_{i,j}$ denotes luminance of the rectangular backlight zone of the ith row and jth column when the liquid crystal display device is configured to display a picture in only one frame and $V_{i,j}$ denotes a sum of pixel voltages of all liquid crystal display pixels in the rectangular panel zones when the liquid crystal display device is configured to display the picture in only one frame.

5. The liquid crystal display device of claim 2, wherein luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

wherein * denotes a multiplication operator, $L_{i,j}$ denotes luminance of the rectangular backlight zone of the ith row and jth column when the liquid crystal display device is configured to display a picture in only one frame, $V_{i,j}$ denotes a sum of pixel voltages of all liquid crystal display pixels in all of the rectangular panel zones when the liquid crystal display device is configured to display the picture in only one frame, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

6. The liquid crystal display device of claim 1, wherein luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}=L_{i,j\_2}*V_{i,j\_2},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

7. The liquid crystal display device of claim 6, wherein luminance of the rectangular backlight zone of the ith row and jth column and the sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

wherein $L_{i,j}$ denotes luminance of the rectangular backlight zone of the ith row and jth column when the liquid crystal display device is configured to display a picture in only one frame and $V_{i,j}$ denotes a sum of pixel voltages of all liquid crystal display pixels in the rectangular panel zones when the liquid crystal display device is configured to display the picture in only one frame.

8. The liquid crystal display device of claim 1, wherein the plurality of liquid crystal display pixels comprises at least one red liquid crystal display pixel, at least one green liquid crystal display pixel and at least one blue liquid crystal display pixel.

9. A method for driving a liquid crystal display device, wherein the liquid crystal display device comprises a liquid crystal display panel and a driving circuit, and the liquid crystal display panel comprises a plurality of liquid crystal display pixels disposed in a matrix, the method comprises:

in a preceding one of two successive frames, applying a pixel voltage, by the driving circuit, to each of the plurality of liquid crystal display pixels of the liquid crystal display panel separately to deflect all liquid crystal molecules of each of the plurality of liquid crystal display pixels, wherein the liquid crystal display panel is configured to display a same picture in the two successive frames; and in a succeeding one of the two successive frames, applying a pixel voltage, by the driving circuit, to each of the plurality of liquid crystal display pixels of the liquid crystal display panel separately to deflect all liquid crystal molecules of each of the plurality of liquid crystal display pixels, wherein in each of the two successive frames, a voltage value of the pixel voltage of each of the plurality of liquid crystal display pixels is different from a voltage value of the pixel voltage of an adjacent liquid crystal display pixels, and the pixel voltages of the same liquid crystal display pixel in the preceding one of the two successive frames and in the succeeding one of the two successive frames have the same polarity and different voltage values;

wherein the liquid crystal display device further comprises: a backlight module, the liquid crystal display panel is divided into (M×N) rectangular panel zones, the backlight module is divided into (M×N) rectangular backlight zones, and the rectangular panel zone of an ith row and jth column corresponds to the rectangular backlight zone of an ith row and jth column, where formulas 1≤i≤M and 1≤j≤N apply; and the method further comprises:

in the preceding one of the two successive frames, after liquid crystal molecules of all liquid crystal display pixels in each of the rectangular panel zones are deflected, driving all of the rectangular backlight zones, by the driving circuit, to emit light simultaneously; and in the succeeding one of the two successive frames, after liquid crystal molecules of all liquid crystal display pixels in each of the rectangular panel zones are deflected, driving all of the rectangular backlight zones, by the driving circuit, to emit light simultaneously;

wherein luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all liquid crystal display pixels in all of the rectangular panel zones when the liquid crystal display device is configured to display the picture in only one frame.

10. The method of claim 9, further comprises:

in the preceding one of the two successive frames, after liquid crystal molecules of all liquid crystal display pixels in the rectangular panel zone of the ith row and jth column are deflected, driving the rectangular backlight zone of the ith row and jth column, by the driving circuit, to emit light until the driving circuit drives all of the rectangular backlight zones to emit light; and in the succeeding one of the two successive frames, after liquid crystal molecules of all liquid crystal display pixels in the rectangular panel zone of the ith row and jth column are deflected, driving the rectangular backlight zone of the ith row and jth column, by the driving circuit, to emit light until the driving circuit drives all of the rectangular backlight zones to emit light.

11. The method of claim 10, wherein luminance of the rectangular backlight zone of the ith row and jth column and a sum of pixel voltages of all liquid crystal display pixels in the rectangular panel zone of the ith row and jth column meet the following formula:

$$L_{i,j\_1} * V_{i,j\_1} = L_{i,j\_2} * V_{i,j\_2},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

12. The method of claim 10, wherein luminance of the rectangular backlight zone of the ith row and jth column and a sum of pixel voltages of all liquid crystal display pixels in the rectangular panel zone of the ith row and jth column meet the following formula:

$$L_{i,j\_1} * V_{i,j\_1} + L_{i,j\_2} * V_{i,j\_2} = 2 * L_{i,j} * V_{i,j},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all liquid crystal display pixels in all of the rectangular panel zones when the liquid crystal display device is configured to display the picture in only one frame.

13. The method of claim 10, wherein luminance of the rectangular backlight zone of the ith row and jth column and a sum of pixel voltages of all liquid crystal display pixels in the rectangular panel zone of the ith row and jth column meet the following formulas:

$$L_{i,j\_1} * V_{i,j\_1} = L_{i,j\_2} * V_{i,j\_2}, \text{ and}$$

$$L_{i,j\_1} * V_{i,j\_1} + L_{i,j\_2} * V_{i,j\_2} = 2 * L_{i,j} * V_{i,j},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all liquid crystal display pixels in all of the rectangular panel zones when the liquid crystal display device is configured to display the picture in only one frame.

14. The method of claim 9, wherein luminance of the rectangular backlight zone of the ith row and jth column and a sum of pixel voltages of all liquid crystal display pixels in the rectangular panel zone of the ith row and jth column meet the following formula:

$$L_{i,j\_1} * V_{i,j\_1} = L_{i,j\_2} * V_{i,j\_2},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, and $V_{i,j\_2}$ denotes a sum of pixel voltages of all liquid crystal display pixels in the rectangular panel zone of the ith row and jth column in the succeeding one of the two successive frames.

15. The method of claim 9, wherein luminance of the rectangular backlight zone of the ith row and jth column and a sum of pixel voltages of all liquid crystal display pixels in the rectangular panel zone of the ith row and jth column meet the following formulas:

$$L_{i,j\_1} * V_{i,j\_1} = L_{i,j\_2} * V_{i,j\_2}, \text{ and}$$

$$L_{i,j\_1} * V_{i,j\_1} + L_{i,j\_2} * V_{i,j\_2} = 2 * L_{i,j} * V_{i,j},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all LCD pixels in all of the rectangular panel zones when the liquid crystal display device is configured to display the picture in only one frame.

16. A method for driving a liquid crystal display device, wherein the liquid crystal display device comprises a liquid crystal display panel and a driving circuit, and the liquid crystal display panel comprises a plurality of liquid crystal display pixels disposed in a matrix form, the method comprises:

in a preceding one of two successive frames, applying a first pixel voltage, by the driving circuit, to a first liquid crystal display pixel of the liquid crystal display panel and applying a second pixel voltage, by the driving circuit, to a second liquid crystal display pixel of the liquid crystal display panel so that liquid crystal molecules of the first liquid crystal display pixel are deflected, wherein the liquid crystal display panel is configured to display a same picture in the two successive frames; and in a succeeding one of the two successive frames, applying the second pixel voltage, by the driving circuit, to the first liquid crystal display pixel of the liquid crystal display panel and applying the first pixel voltage, by the driving circuit, to the second liquid crystal display pixel of the liquid crystal display panel so that liquid crystal molecules of the first liquid crystal display pixel are rotated, wherein the first liquid crystal display pixel is any one of the plurality of liquid crystal display pixels, the second liquid crystal display pixel is a liquid crystal display pixel adjacent to the first liquid crystal display pixel; the first pixel voltage and the second pixel voltage have a same polarity and different voltage values, are stored in an LUT form in the driving circuit and are determined in advance by inputted RGB signals and viewing angles needed to be compensated; wherein the liquid crystal display device further comprises: a backlight module, the liquid crystal display panel is divided into (M×N) rectangular panel zones, the backlight module is divided into (M×N) rectangular backlight zones, and the rectangular panel zone of an ith row and jth column corresponds to the rectangular backlight zone of an ith row and jth column, where formulas 1≤i≤M and 1≤j≤N apply; and the method further comprises:

in the preceding one of the two successive frames, after liquid crystal molecules of all liquid crystal display pixels in each of the rectangular panel zones are deflected, driving all of the rectangular backlight zones, by the driving circuit, to emit light simultaneously; and in the succeeding one of the two successive frames, after liquid crystal molecules of all liquid crystal display pixels in each of the rectangular panel zones are deflected, driving all of the rectangular backlight zones, by the driving circuit, to emit light simultaneously;

wherein luminance of the rectangular backlight zone of the ith row and jth column and a sum of pixel voltages of all liquid crystal display pixels in the rectangular panel zone of the ith row and jth column meet the following formula:

$$L_{i,j\_1}*V_{i,j\_1}+L_{i,j\_2}*V_{i,j\_2}=2*L_{i,j}*V_{i,j},$$

wherein * denotes a multiplication operator, $L_{i,j\_1}$ denotes luminance of the rectangular backlight zone of the ith row and jth column in the preceding one of the two successive frames, $V_{i,j\_1}$ denotes a sum of pixel voltages of all liquid crystal display pixels in the rectangular panel zone of the ith row and jth column in the preceding one of the two successive frames, $L_{i,j\_2}$ denotes luminance of the rectangular backlight zone of the ith row and jth column in the succeeding one of the two successive frames, $V_{i,j\_2}$ denotes a sum of pixel voltages of all liquid crystal display pixels in the rectangular panel zone of the ith row and jth column in the succeeding one of the two successive frames, $L_{i,j}$ denotes luminance of the rectangular backlight zone of the ith row and jth column when the liquid crystal display device is configured to display a picture in only one frame, and $V_{i,j}$ denotes a sum of pixel voltages of all liquid crystal display pixels in all of the rectangular panel zones when the liquid crystal display device is configured to display the picture in only one frame.

* * * * *